United States Patent [19]

Klein

[11] Patent Number: 4,961,895

[45] Date of Patent: Oct. 9, 1990

[54] PROCESS AND APPARATUS FOR MOLDING STRUCTURES COMPRISING LONGITUDINALLY JUXTAPOSED SLATS

[76] Inventor: André Klein, Lijtweg 1201, 2341 HE, Oegstgeest, Netherlands

[21] Appl. No.: 206,742

[22] Filed: Jun. 15, 1988

[30] Foreign Application Priority Data

Jun. 16, 1987 [GB] United Kingdom ............... 8714011
Sep. 25, 1987 [GB] United Kingdom ............... 8722570

[51] Int. Cl.$^5$ .................. B29C 45/13; B29C 45/20; B29C 45/76
[52] U.S. Cl. .................. 264/40.6; 264/40.7; 264/45.4; 264/51; 264/248; 264/251; 264/261; 264/328.7; 264/328.8; 264/328.15; 156/244.22; 425/114; 425/123; 425/129.1; 425/144; 425/145; 425/548; 425/549; 425/562; 425/566
[58] Field of Search .............. 264/DIG. 83, 328.8, 264/328.7, 323, 45.4, 40.6, 40.7, 51, 248, 251, 261, 328.15; 156/79, 244.22; 425/144, 145, 548, 549, 562, 566, 589, 451.9, 114, 123, 129.1

[56] References Cited

U.S. PATENT DOCUMENTS

| | | | |
|---|---|---|---|
| 3,251,912 | 5/1966 | Fish .................................... | 156/79 X |
| 3,306,959 | 2/1967 | Berner ................................ | 264/45.4 |
| 3,953,560 | 4/1976 | Klein ........................... | 264/DIG. 83 |
| 3,983,196 | 9/1976 | Gray ............................ | 264/DIG. 83 |
| 3,992,503 | 11/1976 | Henfrey et al. ............... | 264/328.7 X |
| 4,154,784 | 5/1979 | Ruhl ............................ | 264/DIG. 83 |
| 4,335,068 | 6/1982 | Hemery ........................ | 264/328.7 X |
| 4,539,167 | 9/1985 | Schedel ............................ | 264/323 X |
| 4,563,323 | 1/1986 | Breher ............................ | 264/328.8 X |
| 4,726,758 | 2/1988 | Sekine et al. .................. | 264/328.8 X |
| 4,729,863 | 3/1988 | Müller ......................... | 264/DIG. 83 |

FOREIGN PATENT DOCUMENTS

| | | |
|---|---|---|
| 2230250 | 2/1974 | Fed. Rep. of Germany . |
| 2938622 | 4/1981 | Fed. Rep. of Germany . |
| 3044851 | 7/1982 | Fed. Rep. of Germany . |
| 2481192 | 10/1981 | France . |
| 1141894 | 2/1969 | United Kingdom ........... 156/244.22 |
| 1476967 | 6/1977 | United Kingdom . |
| 2137133 | 10/1984 | United Kingdom . |

Primary Examiner—Hubert C. Lorin
Attorney, Agent, or Firm—Spensley Horn Jubas & Lubitz

[57] ABSTRACT

Process and apparatus for the manufacture of integral roller door structures of any desired length and width, and comprising longitudinally juxtaposed slats separated by integral hinge formations. Such a structure having slats of any desired length can be produced by a semi continuous moulding process in which a molten plastics material and a foaming agent are injected into a mould, the part of the structure so formed being allowed to solidify before removing the solidified structure partially from the mould, then closing mould about the remaining portion of the structure, thereafter moulding a further part of the structure within the mould onto the remaining portion of the previously moulded part and repeating the cycle as often as required. A product of any desired width, measured transversely to the salts, can be produced by welding, edge-to-edge a plurality of lengths of the product produced by the moulding technique, by means of an apparatus incorporating a heated knife which is advanced along the gap between opposing edge faces of the lengths of moulded structure to be welded, to fuse the material of said opposing faces, and further incorporating an extruder which follows the knife and injects molten plastics into said gap to unite with the plasticized opposing edge portions and form a uniform weld, the temperatures of the knife and the extrudate being independently controllable to prevent, substantially, distortion of the product being produced by the welding step.

19 Claims, 3 Drawing Sheets

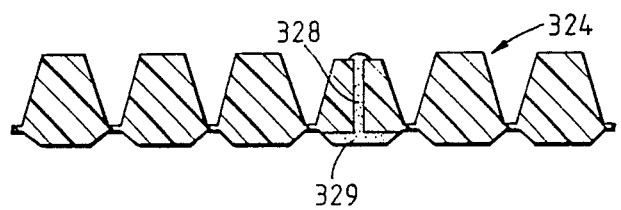
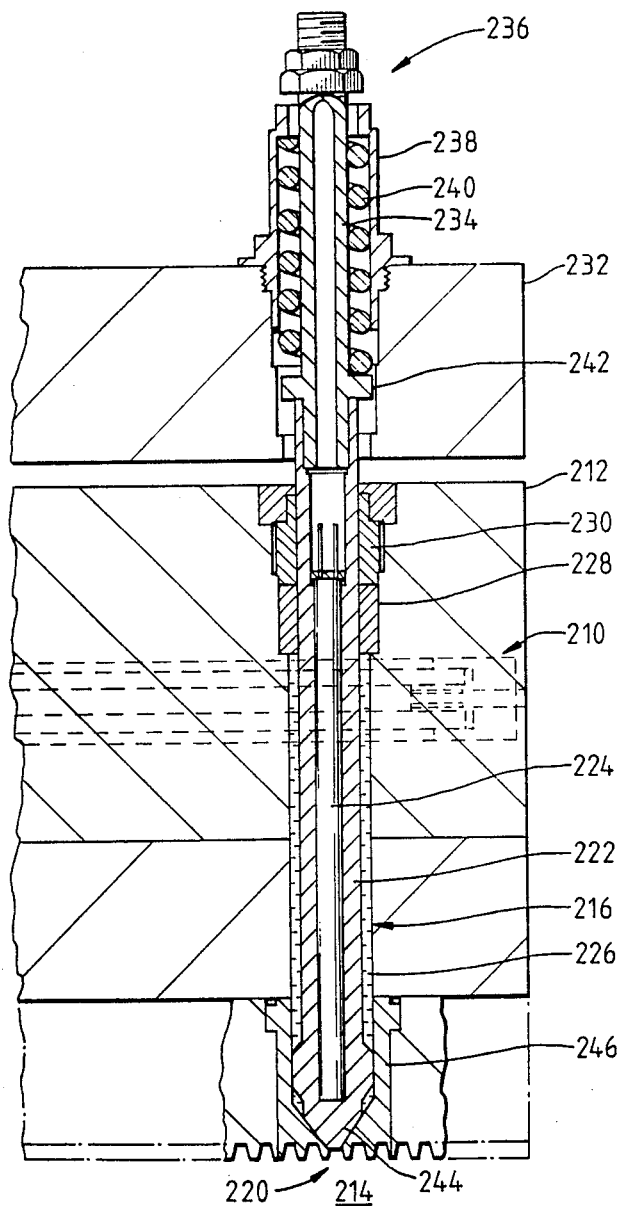

PROCESS AND APPARATUS FOR MOLDING STRUCTURES COMPRISING LONGITUDINALLY JUXTAPOSED SLATS

This invention relates to structures comprising longitudinally juxtaposed slats separated by hinge formations which allow the structure to be folded or rolled. The resultant structures find particular application as closure members in roller doors or tambour doors.

UK Patent No. 1,476,967 describes a moulding process for a structure of this kind in which a molten plastics material and a foaming agent are introduced into a mould. The foamed mass is then compressed by means of an appropriately shaped mould plunger, preferably coincidentally with the completion of the foaming action.

It will be appreciated that the process described in U.K. Patent No. 1,476,967 will require a substantial mould in order to produce a large door of, for instance, in excess of 1m in width and 1m in length. Furthermore, the market for roller doors is understandably not restricted to doors of a single size which means that, at worst, a mould is required for every size and, at best, that a substantial amount of waste would occur where larger moulds are used for the purpose of producing smaller doors by means of cutting.

It will be further appreciated that the cost of large moulds, and of moulding machines suitable for such large moulds, is very high. Furthermore particularly with a structure of the type described in U.K. Patent No. 1,476,967, it becomes progressively more difficult to prevent distortion due to local variation in temperature, or in consistency of the moulded material as mould size is increased.

It is among the objects of the present invention to provide a system by means of which it is possible to produce a moulded structure of the kind referred to, such as a roller door, of any desired size, without the necessity of providing a mould of corresponding dimensions.

According to one aspect of the invention, there is provided a process for the continuous moulding of a roller door structure of size larger than the mould, the structure comprising longitudinally juxtaposed slats separated by hinge formations which allow the folding or rolling of the structure, the moulding process including the steps of introducing a molten plastics material and a foaming agent into a mould, permitting the mixture to foam and compressing the foamed material within the mould by means of an appropriately shaped mould plunger an allowing the part of the structure so formed to solidify at least partially, removing the solidified structure partially from the mould, closing the mould about the part of the structure remaining in the mould and moulding a further portion of the structure onto said remaining part by a repetition of said steps.

It will be appreciated that the process in accordance with first-noted aspect of the invention allows a structure of indeterminate length, greater than that of the mould, but of predetermined width (determined by the mould) to be produced.

The preferred system according to the invention contemplates the welding together, edge to edge, of lengths of the product resulting from the process in accordance with the first-noted aspect of the invention to produce a roller door of any desired width, greater than that of the mould and of any desired length, greater than the mould.

Thus in its preferred form, the system uses a combination of continuous or semi-continuous moulding techniques and welding techniques.

Considering first the moulding aspect of the invention, the moulding process may include the step of moulding an engagement formation on the part of the structure adapted to remain within the mould in order to provide adequate key for the fusion between the parts of the structure formed in subsequent moulding operations.

Subsequent moulding operations may be carried out either longitudinally, that is to increase, at each moulding cycle, the number of slats formed in accordance with the process, or transversely across the width of the structure, that is by increasing the length of the slats.

Preferably the end of the mould which affords the engagement formation is closed during the injection step but is partially open during the subsequent compression step to allow escape of any excess volume of the melt, which can subsequently be trimmed off after solidifying. Allowing excess melt to escape in this manner has been found to be an important factor in avoiding distortion in the moulded product.

According to another aspect of the invention, there is provided apparatus for the continuous moulding of a structure comprising longitudinally juxtaposed slats separated by hinge formations by means of which the structure may be folded or rolled, the apparatus including a fixed mould section, a mould plunger adapted to reduce the internal volume of the mould by a predetermined amount and including clamp means associated with the moulds such that the clamp means and a previously demoulded portion of the structure are adapted to close the mould upon engagement of the demoulded portion by the clamp means.

The clamp means may be shaped complementally to the mould and therefore the demoulded portions of the moulded structure. In one form of the invention, the clamp means is shaped to allow longitudinal demoulding of the structure, while in a second form of the invention, the clamp means is shaped to allow transverse demoulding of the structure.

The mould may be shaped, in each case, to form a key formation on a trailing end of the structure to be moulded within the mould, the trailing end being adapted to remain behind in the mould and the key formation being adapted to provide key for the fusion of a subsequent demoulded portion of the structure onto said key formation.

The apparatus also conveniently includes a take-off assembly which is adapted to remove the moulded portions of the structure from the mould and to reposition the demoulded portions of the structure with a portion of the demoulded structure remaining within the mould for the subsequent moulding thereto of the portion to be formed within the next repeat of the mould process.

The take-off assembly may be provided with appropriate cutting, flash removal and stacking apparatus which may be automatic or semi-automatic.

In order to avoid distortion in the moulded product, it has been found to be important to be able to control accurately, in each locality of the mould cavity, the consistency, volume and temperature of the foamable melt introduced.

To this end, it is advantageous to use multiple injection points to which the melt to be injected is fed by means of a hot runner system. For the foamed melt, it is essential that the injection nozzles be closed positively, that is mechanically or hydraulically and are only opened, simultaneously, at the moment when the mould is prepared for the next shot. Furthermore, due to the partially explosive nature of the foamed melt when entering the essentially unpressurised mould cavity, it is desirable to have the ability to regulate both the degree of opening of the nozzles and the internal temperature thereof to obtain uniform filling of the cavity. By this means it is sought to reduce uneven stress formation within the eventual moulded product with consequent distortion of the product.

Accordingly the apparatus preferably includes a number of injection moulding nozzles constituted by externally operated lift-type needle valves, the needles or punch-shaped valve members of which each include a valve stem which extends through a cavity in a hot runner system forming part of the melt supply to the mould and through an aperture formed in a valve actuation plate, each valve stem and the valve actuation plate including a respective stop or abutment arrangement. Each abutment arrangement is preferably individually adjustable which allows the respective valve member to be raised, more or less, from the valve seat, thus regulating the opening of each valve separately.

Each valve member may be heated by means of a controllable heating arrangement, such as a thermocouple controlled heating cartridge.

Considering now in more detail the factors affecting the welding aspect of the invention, it should be appreciated that plastics sheeting of a foamed composition and the roller door construction described above are particularly difficult to weld and hitherto both mirror and extrusion welding have been investigated as a means of joining sheet material of this nature.

Mirror welding comprises the insertion of a heated metal plate between the edges to be welded. When a sufficiently large bead of molten plastics forms on either side of the mirror, the mirror is retracted and the molten edges are brought into contact under controlled pressure and retained in this position until the weld has cooled and set. The beads so formed can be machined off.

When applied to foamed plastics material and the roller door construction described above in particular, certain problems arise with the mirror welding technique. As the edges to be welded together melt, the air contained within the cells expands and rises towards the surface of the sheets where a number of air bubbles are trapped beneath the surfaces of the molten beads. Upon setting of the beads and subsequent machining down to the surface of the sheets, the bubbles are exposed giving rise to an unacceptable appearance of the finished weld. With thin sheets, the mirror, with its relatively massive structure, presents a substantial source of heat which is difficult to control so that distortion and buckling of the material adjacent the weld becomes inevitable.

The extrusion welding technique relies on the use of a jet of preheated air or an inert gas to melt the two edges to be joined. In the melting process, an extruded bead of molten plastics is allowed to flow into the joint area and after setting of the bead, the excess material of the bead can be machined off. It will be appreciated that the temperature and application of a jet of hot gas is possibly even more difficult to control than that of a metal plate, once again resulting in unacceptable distortion of the sheet material adjacent the weld It is a further object of the invention, in another of its aspects, to provide a means of welding plastics products, such as foam plastics sheets or roller door structures of the kind specified, which is less prone to cause distortion in the welded products than the known welding techniques referred to above.

According to this aspect of the invention, there is provided a process for the welding together of two thermoplastics components, comprising arranging the components in juxtaposition with a narrow gap therebetween, advancing along said gap a heated member to melt the opposing surfaces of the two components, and extruding into said gap, behind said heated member, a bead of molten thermoplastics material to unite with said molten opposing surfaces and form, on solidification of the thermoplastics material, a welded joint between said components.

It will be appreciated, of course, that the welding technique of the invention may, in fact, find much wider application in the welding of plastic structures other than roller doors, i.e. having different configurations, whether or not the material is of a foamed composition, and whatever the angle at which the welding has to be effected.

Thus the welding process may be thus applied to solid or foamed slabs, plates, profiled sections, tubes, etc., and may be effected in one plane or at an angle.

According to a yet further aspect of the invention, there is provided apparatus for welding together the adjacent edges of thermoplastic sheet materials the apparatus being characterised by the provision of a heated knife adapted at least partially to melt the material of the edges to be welded, an extrusion die located rearwardly of the knife and adapted to introduce a molten extrudate of a material compatible with the material of the sheets to be welded between the adjacent edges and means to move the apparatus relatively to the sheet material in advance of the weld formed by the apparatus.

The arrangement is preferably such that the temperature of the knife, and that of the extrudate can be accurately controlled independently of one another.

The movement of the apparatus relatively to the sheet material may be effected by moving the apparatus and retaining the sheet material in a stationary position. It is in this context that the term "rearwardly", must be understood to indicate the positioning of the extrusion die behind the knife, seen in the direction of the apparent motion of the apparatus relatively to the sheet material.

Conversely, it is also possible to maintain the apparatus in a stationary position and move the appropriately clamped sheet material against it.

The apparatus may include a screw extruder opening into a heated die. The knife may conveniently be secured to the die by means of a block of material with bad heat transfer characteristics. In order accurately to control the temperature of the knife, separate heating means for the knife is provided within the knife mounting. By varying the temperatures of the knife and/or the extrudate, and the speed of advance of the welding assembly, the best welding speed can be determined for each different type of thermoplastic material and/or article.

The die may open into a shoe, which may be of PTFE (TEFLON) which would aid in deposition of the extrudate and help to force it into the gap between the two sheets to be welded.

The edges of the sheet material have, of course, to be clamped fairly securely and the clamp may comprise an assembly of bars or rails extending longitudinally along the edges to be welded, which bars may be configured to constitute a guideway by means of which the welding apparatus may be guided and spaced relatively to the edges to be welded.

For profiled sheet material, such as the roller doors under discussion, the clamp is preferably profiled in order to accommodate the profiled sheet material.

Embodiments of the invention are described below by way of example with reference to the accompanying drawings in which:

FIG. 9 illustrates the weld achieved with the mould clamp of FIG. 8: and

FIG. 10 illustrates an injection moulding nozzle which may be used in apparatus embodying the invention.

Figure 1:
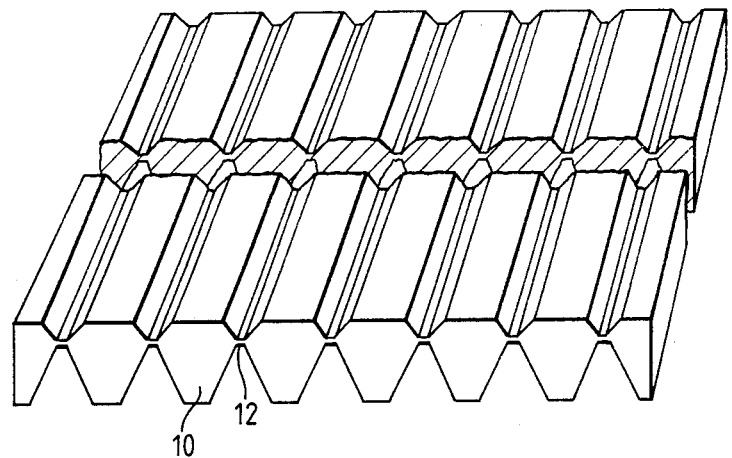
FIG. 1 is a perspective view of a roller door structure which is the subject of this invention.

The process described in U.K Patent No. 1,476,967 produces a monolithic foamed plastics roller door construction such as that shown in FIG. 1. As a result of the compression of the foamed material within the mould, a plurality of high density foam slats 10 are produced which are separated by hinge formations 12 of even higher density.

For the purpose of this specification, the dimension extending transversely across the slats 10 will be taken as the length of the structure or roller door while the dimension extending along the slats will be taken as the width thereof. Any increase in length will, therefore, result in an increase in the number of slats and any increase in the width of the structure will result in an increase in the length of the slats.

The system described in this specification comprises the combination of semi-continuous moulding, either in the lengthwise or the widthwise directions of the roller door, with the welding together of the moulded roller door sections so produced, which moulding process is facilitated by the use of the injection moulding nozzles forming part of the apparatus and which are described below.

Figure 2:
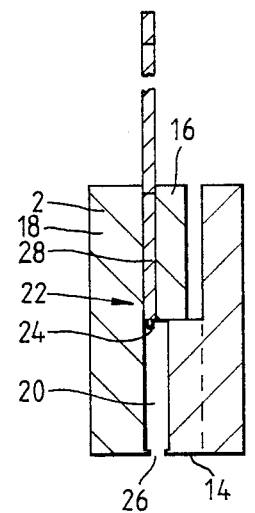
FIGS. 2 and 3 are diagrammatic sections through transverse continuous moulding apparatus.
Figure 3:
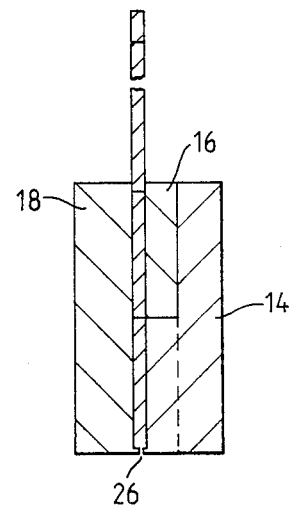

The apparatus shown in FIGS. 2 and 3 provides a means of continuous or semi-continuous moulding of the roller door structure in the transverse direction, that is by increasing the length of the slats 10 in a semi-continuous manner.

In FIG. 2 a mould 14, 16, 18 for moulding a roller door structure 28 is shown in a position in which it is incompletely closed, but in which a previously moulded roller door portion, kept firmly in position by a clamping section 16, closes the upper end of a mould cavity 20, defined between a mobile mould section 18 and a fixed mould section 14 and which cavity is ready to receive the injection of further plastics material.

The plastics material includes a foaming agent which will commence foaming as soon as the material has been introduced into the mould cavity 20. As soon as sufficient foaming of the plastics mix has taken place, the mould cavity 20 is reduced in volume by compression, the mobile mould section 18 being urged, by hydraulic, pneumatic or other means to compress the foamed melt, by completely closing the mould to a preset stop, corresponding to the desired hinge thickness, the clamping section 16 following the movement of the mould section 18. The position is then shown as in FIG. 3. Once the melt has solidified the mould is opened sufficiently and the section 16 withdrawn from section 18 sufficiently, for the extraction of the moulded portion of the roller door by means of jacks, pinch rollers or the like. The take-off assembly is adapted to extract (upwards in FIGS. 2 and 3) the moulded section of the roller door to an extent just sufficient to retain a trailing end of the moulded section within the mould. This could be achieved with the use of sensors, preset stops or the like. Once the extraction step has been completed, the mobile clamping section 16 is actuated, clamping the moulded roller door section against the mobile mould section 18 which is pushed back, at the same time, against a preset stop, leaving the mould in a position, shown in FIG. 2, to receive the next shot of the melt.

The mobile mould section 18 is now in position for injection of the next quantity of melt which is then foamed and compressed within the mould cavity 20 and around a key formation 24 depending from the trailing end 22 of the immediately preceding moulded roller door section 28. The newly introduced material welds to the key formation 24 to produce, in the finished roller door, hardly visible weld lines extending longitudinally along the roller door, i.e. across each slat.

As noted above, the trailing end 22 of each of the door sections formed in the mould is formed with a key formation 24 which is retained within the mould after demoulding. The key formation is moulded by means of a restriction formation 26 configured within the rear end of the mould cavity 20. The mould cavity 20, when the mould section 18 has been clamped against the mould section 14 is effectively open at two opposing ends (namely its upper and lower ends as viewed in FIGS. 2 and 3) the open upper end being unrestricted and communicating with the region defined between the clamping section 16 and the upper part of mould section 18, the lower end of the mould cavity, somewhat restricted by the formation 26, being open to atmosphere and having the dual function of forming the tail and/or key formation 24 and of allowing any excess volume of the melt to escape. The open but restricted character of the lower end of the mould cavity further ensures proper filling of the mould cavity 20 and the simultaneous creation of greater pressure and therefore material density in the key formation 24. Any excess or overflow of the melt from the restricted lower end of the mould cavity is cut off by a knife which is actuated shortly after closing of the mould. This escape of excess material also ensures that the moulded plates are and stay flat whatever their widths. This avoids uneven stresses being created within the plates, which would induce serious warpage.

Preferably the knife is a reciprocating knife and is extended across the lower end of the mould cavity, to close said lower end, before and during the injection step, when the mould sections 14 and 18 are still somewhat separated, i.e. in the positions shown in FIG. 2, the knife being retracted, however, from the open lower end of the mould cavity just before the compression step (i.e. the step in which the mould section 14 is urged towards the mould section 18, to assume the position shown in FIG. 3), to allow the escape of any excess melt. The knife is then moved across the lower end of the mould again, to cut off cleanly any soldified plastic projecting from the lower end of the mould, just before the mould is opened for demoulding. Allowing the escape of any excess melt minimizes residual stresses in the delicate roller door structure and ensures that even sections with several welds stay flat.

A take-off assembly may be provided comprising clamps, guided carriages and saws by means of which the essentially endless roller door can be cut to the required widths i.e., to required lengths of slats. The take-off assembly may include a trimming unit which will deliver clean, flash free plates for packaging.

The take-off assembly may be automated to a greater or lesser degree and may even include robot-type manipulators in order completely to automate the take-off and cutting process.

As indicated, in the process described with reference to FIGS. 2 and 3, the slats 10 extend in the direction in which the moulded sections are withdrawn from the mould during de-moulding, so that the slats increase in length in each moulding cycle.

In an alternative process, the width of the eventual roller door sections moulded (i.e. the lengths of the slats), could be fixed and the length thereof, that is the number of slats included within the roller door section moulded, could be indeterminate. This process can be carried out with a longitudinal semi-continuous moulding apparatus such as that shown in FIG. 4.

Figure 4:
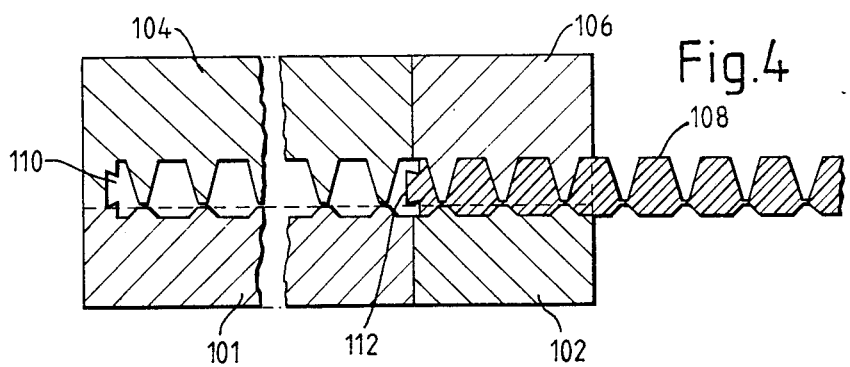
FIG. 4 is a diagrammatic section through a mould for longitudinal continuous moulding.

The mould of FIG. 4 includes a fixed section including a fixed mould half 101 and a fixed clamping section 102 opposed by a mobile mould half 104 and a mobile clamping section 106. In this apparatus, the process also follows the steps of:
  incompletely closing the mould, and clamping the previously moulded sheet with the mobile clamping section 106:
  injection of the melt:
  foaming the melt:
  compressing the foamed melt by completely closing the mould to a preset stop:
  demoulding and partial removal of the moulded roller door sections:
  clamping of the remaining portion to close the mould on one side, and by doing so, closing the mould incompletely on the remaining sides: and
  repeating the process from the injection step.

In the mould shown in FIG. 4, the mobile sections 104 and 105 will, of course, have to be raised sufficiently to allow the removal of the moulded roller door section 108 to a position where the section 108 is clamped between the jaws 102 and 106 of the clamp. The mould is formed with a dove-tail or key formation 110 to form a complemental dove-tail formation 112 on the trailing end of the moulded roller door section 108. It will be appreciated, of course, that at each moulding cycle, the injected material fuses itself, i.e. welds itself, to the key formation 112 of the previously moulded section.

The press shown in FIG. 4 is preferably arranged horizontally in the manner illustrated with the mobile sections 104 moving vertically up and down. The profiled face of the mobile section could be lifted fairly easily by ejector pins, compressed air or the like. Once outside the press, the roller door section 108 could either be rolled up or cut to the desired length after the necessary flash removal and trimming.

Once again, an automated take off assembly could be used.

The mould and clamp arrangements described above could also be used as single shot moulds with the clamp sections serving, essentially, as parts of the mould. It will, of course, be necessary to ensure that the apparatus ancillary to the mould itself is capable of producing and handling the larger volumes and pressures that would be required in such an arrangement. This way of operating is equivalent to the use of a three-sided mould in the sense that the section of the mould which is open to the top in the drawings (i.e. in FIGS. 2 and 3) is not closed by a mould wall. This ensures, in combination with the open bottom (in FIGS. 2 and 3) of the mould, that effective stress relief within the moulded product is possible. A knife may be used to cut off any excess of overflow of the melt. Alternatively the knife can be dispensed with and replaced by a solid bar closing the bottom (in FIGS. 2 and 3) part of the mould.

It is possible to weld together the sections of a roller door material such as shown in FIG. 1, produced by the method and in the apparatus described with reference to FIGS. 2, 3 or 4, in the manner described below with reference to FIGS. 5 to 9, using apparatus shown in FIGS. 5 and 8.

Thus, in the preferred embodiment, lengths of the product of the semi-continuous moulding process described with reference to FIGS. 2 and 3, i.e. having slats of any desired length but having numbers of slats determined by the mould, are welded together side by side, i.e. along edges extending parallel with the slats, to form a roller door having a desired number of slats. That is to say by combining such semi-continuous moulding technique and such a welding technique, it is possible to produce a roller door of any desired length and width, without limitation by the size of the mould.

Figure 5:
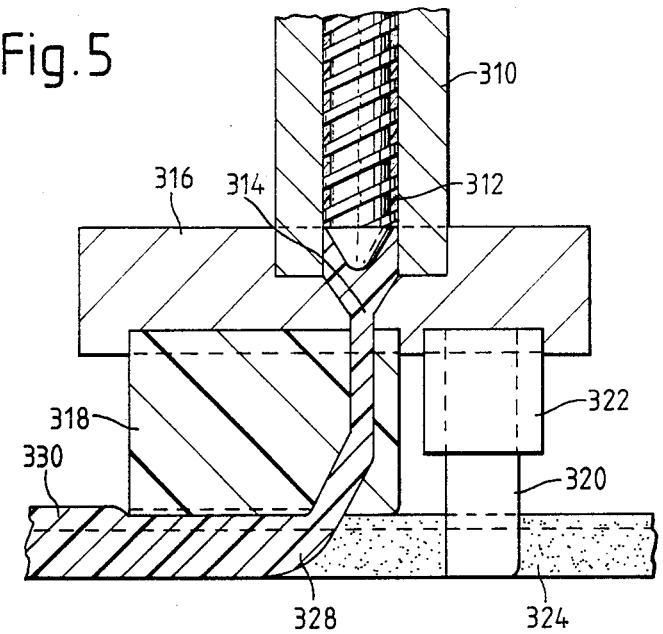
FIG. 5 is a diagrammatic sectional side elevation of welding apparatus embodying the invention.

The welding tool assembly shown in FIG. 5 comprises a plastics material extruder 310 with a screw impeller 312 by means of which a granular plastics material is forced through a die 314 in a tool holder 316. The molten extrudate is extruded through the die and into a TEFLON shoe 318. A separately heated and temperature controlled knife 320 is secured to the tool holder 316 by means of a heating block 322 and the entire assembly is shown in position on a sheet of roller door material 324.

Figure 6:
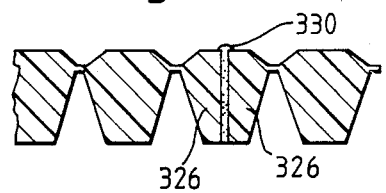
FIG. 6 is a diagrammatic section through roller door sheet material after welding.
Figure 7:
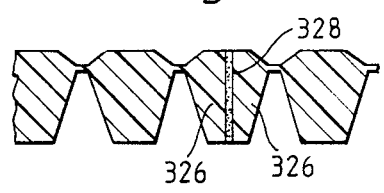
FIG. 7 is a diagrammatic section through the roller door material after the removal of the weld bead.

In preparation for such welding, a respective slat 10 at a respective edge of each of the two sections or lengths of the roller door material to be welded together is cut longitudinally so that slightly less than half of the slat remains (or the sections may be moulded so as to afford such 'half' slats at the edges) and the two sections or lengths to be welded together are laid flat so that the slats of the two sections run parallel with each other and so that the respective cut (or moulded flat) adjacent edges of the 'half' slats of the two sections oppose each other across a narrow longitudinal gap, whereby when, as a result of the welding step to be described, said narrow gap is filled with extruded plastics material united with that of the slat portions on either side, a welded slat is formed which is of the same width as the other slats of the two sections thus united. In FIGS. 6 and 7, the two adjoining 'half' slats are indicated at 326.

The welding step is effected by passing the welding tool of FIG. 5 longitudinally, to the right in FIG. 5, with the knife 320 extending downwardly through said narrow gap and the extruder 310 and shoe 318 extruding molten plastics into said gap.

The welding tool assembly is moved to the right, in FIG. 5, relatively to the sheet material 324. It will be appreciated that it is the apparent direction of movement of the welding tool assembly that is referred to here since the assembly might be retained in a stationary position with the sheet material 324 being moved relatively to the assembly.

The knife 320 advances ahead of the TEFLON shoe 318 and melts the edges of the sheet material to a degree sufficiently to allow proper welding of the extrudate 328 which is forced into the gap between the edges of the sheet material 324 by the die 314 and the TEFLON shoe 318. The extrudate forms a bead 330 (FIG. 6) on the surface of the sheet material after welding and, as can be seen from FIG. 7 when compared to FIG. 6, the bead 330 can be removed subsequently to provide a clean welded sheet.

The molten extrudate 328 mingles and fuses with the molten edges of the sheet material 324 under pressure and forms a good weld. Due to the downward movement and pressure of the extrudate, any air bubbles are prevented from rising to the surface. In addition, since the hot knife 320 remains in contact wth the edges of the sheets for only a short period of time, any distortion of the sheet material is negligible.

The weld formed, after removal of the bead 330, is free from sink marks, bubbles or other defects detrimental to the strength of the weld or its aesthetic appearance.

The edges of the sheet material will, of course, have to be clamped down in order to position them accurately for the welding process. A slightly modified clamping arrangement could be used as a means of speeding up or eliminating the flash removal process. Such an arrangement is shown in FIG. 8 to comprise a clamp base 332 including a shaped clamp having parallel ribs to locate in respective channels formed, in the region of the respective hinge formations, on the inner sides of the two half, slats, and profiled clamping jaws 336, the arrangement being such that the clamp base 332 and jaws 336 together define, in effect, a cavity 334 complementary in section with that of a complete slat 10. Preferably, as illustrated, the half slats, to be welded together, on the edges of two sheets of roller door material, are moulded or trimmed so that they form, in essence, a pair of truncated half slats in which the faces of the half slats project (downwardly in FIG. 8) to a lesser extent than the immediately adjacent slats. This leaves a space within the mould cavity 334 into which the molten extrudate 328 can be forced, effectively to mould a slat face onto the half slats welded together. In the clamp arrangement shown in FIG. 8, the adjacent roller door sheets 324 are clamped to the clamp base 332 by means of the profiled clamp jaws 336 which, between them, define a channel 338 into which the welding tool assembly may fit. This channel may be extended to define a guideway for the welding too assembly.

Figure 8:
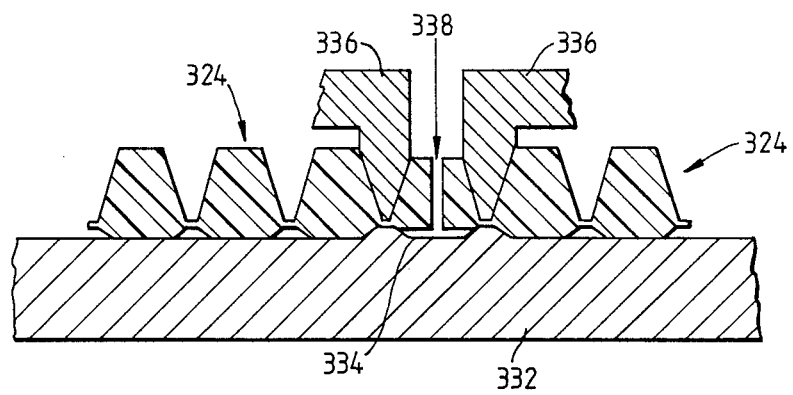
FIG. 8 is a diagrammatic section through a clamp arrangement for apparatus embodying the invention.

The moulded-on weld resulting from the use of the clamping arrangement shown in FIG. 8 can be seen clearly in FIG. 9 where the extrudate 328 has flowed through to the front of the slat face to define a moulded on slat face 329.

It will be appreciated, of course, that in any particular case in which a roller door is required which is of a dimension no greater, in the direction transverse to the direction of intermittent advancement from the mould, than the product coming directly from the mould in the semi-continuous moulding process, then the welding step external to the mould will be unnecessary, and the invention is not restricted to the application of both techniques to every product.

Considering now, in more detail, the preferred construction of the moulding apparatus described with reference to FIGS. 2 and 3, or the variant described with reference to FIG. 4, the apparatus preferably utilizes a hot runner system feeding a number of injection nozzles, to inject the foamable plastics melt into the injection section of the mould, in order to ensure maximum uniformity and homogeneity of the molten foam created in the mould cavity before compression.

The openings and temperatures of the injection nozzles are individually adjustable. These injection nozzles are advantageously of the type shown in FIG. 10 and described below and which has been found to operate successfully.

Thus, FIG. 10 shows an injection moulding nozzle which is one of a plurality of nozzles which control the flow of the hot melt from the interior of a hot runner system 210 formed in a hot runner block 212 which constitutes one side of a mould cavity 214 corresponding to the cavity 20 in FIG. 2 or to the mould cavity in the variant of FIG. 4. A respective melt supply cavity 216 is formed transversely to the runners of the hot runner system 210 and the hot melt is transferred from the runners through a respective injection point 220 into the mould cavity 214, the injection point 220 being formed in the ridged face plate of the fixed part of the mould cavity.

A cylindrical punch 222 which constitutes the needle or punch-like valve member of the externally operated valve constituting the injection moulding nozzle, is free to move inside the melt supply cavity 216 and a thermocouple-controlled heating cartridge 224 is located w thin the interior of the punch 222. The outer diameter of the punch is smaller than that of the cavity 216 and the annular space 226 so formed receives the hot melt, the temperature of which is maintained by the temperature controlled heating cartridge which allows fine regulation of the temperature of the punch and therefore of the melt in the melt space 226.

A close fitting bush 228 seals the upper end of the melt cavity 216, the bush being held in place by a nut 230 secured into the hot runner block 212.

The rear end of the punch 222 which, in effect, constitutes a valve stem, extends from the hot runner block 212 and into a valve actuation plate 232 which can be moved towards and away from the hot runner block 212 to actuate the valves in the manner described below. An extender tube 234 is secured into the extending portion of the punch 222 and an adjustable nut and lock nut arrangement 236 is secured to the end of the extender tube 234. A metal cap 238 is secured into the upper surface of the valve actuation plate 232 and a compression spring 240 acts between the upper end of the cap and a flange-like shoulder 242 formed on the extender tube 234. The compression spring 240 serves to close the tip 244 of the punch 222 against the valve seat formed in a valve seat insert 246 in the hot runner block 212. The degree of compression and hence the force exercised by the spring 240 is adjusted by screwing the cap 238 into or out of the valve actuation plate 232. The closing force exercised by the spring has, of course, to be sufficient to counteract the pressure under which the plastic melt flows into the melt supply cavity 226.

The valve actuation plate 232, when it is moved away from the hot runner block 212, serves to open the valves by raising each punch 222 away from its valve seat in the respective valve seat insert 246. This is done by the respective cap 238 acting against the undersurface of the nut and lock nut arrangement 236. By screwing the nut and lock nut arrangement 236 tightly against the end of the cap 238, the respective punch can be made to retract fully from its seat when the valve actuation plate 232 is moved away from the hot runner block 212 and by placing the nut and lock nut arrangement further away, the degree of raising the punch 222 can be progressively adjusted up to a point where the punch is not raised at all. In this case the nozzle in question will not be available to inject the melt into that particular position in the mould cavity at all.

The arrangement herewith described allows the individual setting of the nozzle openings only when the moulding process is stopped and access to the rear side of the mould is made possible. By replacing each nut and lock nut arrangement 236 with an appropriate gear wheel arrangement, it is possible to effect the regulation of the nozzle openings while the moulding operation is in progress.

By mechanically regulating the opening of the nozzles in this manner, a quantity of foaming melt of reasonably uniform density can be injected into the mould cavity and its flow towards the weld line where the door portion being moulded fuses with the key formation of the previously moulded door portion will be that of a rectilinear moving front, thereby achieving uniform density at the weld line itself. In addition, by thermally regulating the temperature of the nozzles in the manner described above, further fine tuning of the injection process can be achieved.

The moulds described with reference to the drawings may be so constructed that by the simple interchange of profiled plates forming the cavities in both the injection and compression sections, roller doors of any profile can be produced. In particular, by changing only the profile plates in the moving part of the mould and leaving the same profiled plates in the fixed part of the mould, a family of roller door structures can be obtained, i.e., doors which are similar in design but have the hinges at intervals which are multiples of the one determined by the fixed mould profile.

By combining the various elements of the system together, it is possible to produce, on an industrial, mass-produced basis, roller doors according to UK Patent No. 1,476,967 of any size and which are substantially monolithic.

The features disclosed in the foregoing description, in the following claims and/or in the accompanying drawings may, both separately and in any combination thereof, be material for realising the invention in diverse forms thereof.

I claim:

1. A process for the welding together of two thermoplastics components, comprising arranging the components in juxtaposition with a narrow gap therebetween, advancing along said gap a heated member to melt the opposing surfaces of the two components, and extruding into said gap, behind said heated member, a bead of molten thermoplastics material to unite with said molten opposing surfaces and form, on solidification of the thermoplastics material, a welded joint between said components.

2. A process for the production of a roller door structure comprising longitudinal juxtaposed slats separated by hinge formations which allow the folding or rolling of the structure, the process comprising arranging, side by side, two lengths of a plastics product, each said length comprising a plurality of such longitudinally juxtaposed slats separated by such hinge formations, and each so formed as to terminate, at its longitudinal edge adjoining the other length, in a partial slat corresponding substantially in form to a respective one of the two part-slats which would result in dividing one of the complete slats in two along a plane extending between the hinge formations on either side of such a complete slat, to provide a generally flat outwardly facing edge face, the two said lengths being so arranged side by side that said edge faces of the two lengths oppose each other across a narrow gap defined therebetween, the process further including the steps of advancing along said gap a heated member to melt the opposing edge faces of the two lengths and extruding into said gap, behind said heated member, a bead of molten thermoplastics material to fuse with said molten opposing surfaces and form, on solidification of the thermoplastics material, a welded joint between said lengths.

3. Apparatus for welding together two thermoplastic components including a heatable member adapted at least partially to melt the material of the edges to be welded, an extrusion die located rearwardly of the heatable member and means adapted to introduce, through the extrusion die, a molten extrudate of a material compatible with the material of the sheets to be welded between the adjacent edges and means to move the apparatus relatively to the sheet material in advance of the weld formed by the apparatus, the arrangement being such that, in operation, the temperature of said heatable member and of said extrudate can be separately adjusted.

4. A method for the production of a roller door structure of a desired length and width, said structure, comprising a plurality of juxtaposed slats separated by hinge formations, which allow the folding or rolling of the structure, using a mould smaller in width and length than the roller door structure, the method comprising producing, by a moulding process, using said mould, a plurality of lengths of a moulded product comprising a plurality of such juxtaposed slats separated by such hinge formations, the moulding process including the steps of introducing a molten plastics material and a foaming agent into a mould, permitting the mixture to foam and compressing the foamed material within the mould be means of an appropriately shaped mould plunger and allowing the part of the structure so formed to solidify at least partially, partially removing the solidified structure from the mould, closing the mould about the remaining part of the structure and moulding, in the mould, a further portion of the structure onto the remaining parts of the previously moulded part of the structure, by a repetition of the above process, the method further including arranging, side by side, two lengths of said product, each so formed as to terminate at its longitudinal edge adjoining the other length, in a partial slat corresponding substantially in form to a respective one of the two part-slats which would result in dividing one of the complete slats in two along a plane extending between the hinge formations on either side of such a complete slat, to provide a generally flat outwardly facing edge face, the two said lengths being so arranged side by side that said edge faces of the two lengths oppose each other across a narrow gap defined therebetween, the process further including the steps of advancing along said gap a heated member to melt the opposing edge faces of the two lengths and extruding into said gap, behind said heated member, a bead of molten thermoplastics material to unite with said molten opposing edge faces and form, on solidification of the thermoplastics material, a welded joint between said lengths.

5. A process for the continuous molding of a roller door structure having a length dimension and a width dimension and composed of a plurality of slats extending along the width dimension, juxtaposed along the length dimension, and separated by hinge formations which are integral with the slats and which allow folding or rolling of the structure, said process comprising:
 (a) providing a mold which is smaller than the structure in a first direction parallel to one of the length dimension and the width dimension of the structure, which defines a mold cavity for forming a portion of the structure, which is open along opposed first and second edges of the cavity which extend in a second direction perpendicular to the first direction, and which includes a fixed mold part and a movable mold part which define opposed surfaces of the mold cavity and are movable to ward and away from one another;
 (b) introducing a molten plastics material and a foaming agent into the mold;
 (c) permitting the mixture to foam and compressing the foaming mixture within the mold by moving the movable mold part toward the fixed mold part while the mold cavity is exposed to the environment via the first edge, to form a part of the structure, and allowing the part of the structure so formed to solidify at least partially;
 (d) removing the solidified structure partially from the mold;
 (e) closing the mold about the part of the structure remaining in the mold; and
 (f) molding a further part of the structure onto said remaining part by a repetition of said steps (b) and (c).

6. A process for the continuous molding of a roller door structure having a length dimension and a width dimension and composed of a plurality of slats extending along the width dimension, juxtaposed along the length dimension, and separated by hinge formations which are integral with the slats and which allow folding rolling of the structure, said process comprising:
 (a) providing a mold which is smaller than the structure in a first direction parallel to one of the length dimension and the width dimension of the structure, which defines a mold cavity for forming a portion of the structure, which is open along at least one edge of the cavity which extends in a second direction perpendicular to the first direction, and which includes a fixed mold part and a movable mold part which define opposed surfaces of the mold cavity and are movable toward and away from one another;
 (b) providing a plurality of injection nozzles each having an outlet opening and assembling the nozzles with the mold so that plastic material injected into the mold via the outlet openings will flow toward the one edge along a rectilinear moving front;
 (c) introducing a molten plastics material and a foaming agent into the mold via the nozzles;
 (d) individually adjusting the temperature of the plastic in each nozzle;
 (e) permitting the mixture to foam and compressing the foaming mixture within the mold by moving the movable mold part toward the fixed mold part to form a part of the structure, and allowing the part of the structure so formed to solidify at least partially;
 (f) removing the solidified structure partially from the mold;
 (g) closing the mold about the part of the structure remaining in the mold; and
 (h) molding a further part of the structure onto said remaining part by a repetition of said steps (c), (d) and (e).

7. A process according to claim 6 which includes the step of moulding an engagement formation on the part of the structure adapted to remain within the mould in order to provide adequate key for the fusion between the parts of the structure formed in subsequent moulding operations.

8. A process according to claim 6 wherein subsequent moulding operations are carried out transversely to the slats in such a way as to increase, at each moulding cycle, the length of the structure by increasing the length of the slats.

9. A process according to claim 6 wherein subsequent moulding operations are carried out in such a way as to increase, at each moulding cycle, the number of slats in the product.

10. Apparatus for the continuous molding of a roller door structure having a length dimension and a width dimension and composed of a plurality of slats extending along the width dimension, juxatposed along the length dimension, and separated by hinge formations which are integral with the slats and which allow folding or rolling of the structure, said apparatus comprising:
 (a) a mold which is smaller than the structure in a first direction parallel to one of the length dimension and the width dimension of the structure, which defines a mold cavity for forming a portion of the structure, which is open along opposed first and second edges of the cavity which extend in a second direction perpendicular to the first direction, and which includes a fixed mold part and a movable mold part which define opposed surfaces of the mold cavity and are movable toward and away from one another;
 (b) means disposed for introducing a molten plastics material and a foaming agent into said mold so as to permit the mixture to foam in said mold;
 (c) means for compressing the foaming mixture within said mold by moving said movable mold part toward said fixed mold part while the mold cavity is exposed to the environment via the first edge, to form a part of the structure, which part is allowed to solidify at least partially; and
 (d) clamp means associated with said mold and arranged to cooperate with a previously demolded part of the structure to close said mold along one of said edges of the cavity upon engagement of the previously demolded part with said clamp means.

11. Apparatus according to claim 10 wherein the mould includes at least one injection moulding nozzle constituted by an externally operated lift-type valve, the valve member of which includes a valve stem which extends through a cavity in a hot runner system forming part of the melt supply to the mould and through an aperture formed in a valve actuation plate, the valve stem and the valve actuation plate having a mutual abutment arrangement which is adjustable to adjust the lift of the valve member from its valve seat.

12. Apparatus according to claim 11 wherein the valve member is heated by means of a controllable heating arrangement, such as a thermocouple controlled heating cartridge.

13. Apparatus for the continuous molding of a roller door structure having a length dimension and a width dimension and composed of a plurality of slats extending along the width dimension, juxtaposed along the length dimension, and separated by hinge formations which are integral with the slats and which allow folding or rolling of the structure, said apparatus comprising:
(a) a mold which is smaller than the structure in a first direction parallel to one of the length dimension and the width dimension of the structure, which defines a mold cavity for forming a portion of the structure, which is open along at least one edge of the cavity which extends in a second direction perpendicular to the first direction, and which includes a fixed mold part and a movable mold part which define opposed surfaces of the mold cavity and are movable toward and away from one another;
(b) a plurality of injection nozzles each having an outlet opening, said nozzles being positioned relative to said mold so that the outlet openings communicate with the mold cavity along a line parallel to the one edge, said nozzles being connected for introducing a molten plastics material and a foaming agent into said mold for permitting the mixture to foam in said mold;
(c) means for individually adjusting the temperature of the plastic in each nozzle;
(d) means for compressing the foaming mixture within said mold by moving said movable mold part toward said fixed mold part to form a part of the structure, which is allowed to solidify at least partially; and
(e) clamp means associated with said mold and arranged to cooperate with a previously demolded part of the structure to close said mold along said at least one edge of the cavity upon engagement of the previously demolded part with said clamp means.

14. Apparatus according to claim 13 wherein the clamp means is shaped complementary to the mould and therefore the demoulded portions of the moulded structure.

15. Apparatus according to claim 13 wherein the mould is shaped, in each case, to form a key formation on a trailing end of the structure to be moulded within the mould, the trailing end being adapted to remain behind in the mould and the key formation being adapted to provide key for the fusion of a subsequent demoulded portion of the structure on to said key formation.

16. Apparatus according to claim 13 which includes a take-off assembly which is adapted to remove the moulded portions of the structure from the mould and to reposition the demoulded portions of the structure with a portion of the demoulded structure remaining within the mould for the subsequent moulding thereto of the portion to be formed within the next repeat of the mould process.

17. Apparatus as defined in claim 13 wherein said means for individually adjusting the temperature of the plastic in each nozzle comprise, for each nozzle, an individually controllable heating device disposed within said nozzle, and each said nozzle further comprises means for varying the effective area of said nozzle outlet opening in order to control the rate of flow of plastic material through said outlet opening.

18. A process for the continuous moulding of a roller door structure comprising juxtaposed slats separated by hinge formations which allow the folding or rolling of the structure, said process comprising:
(a) providing a mold which includes a first mold section and a second mold section which define opposed operative surfaces complementary to the opposite surfaces of the structure to be molded, said first mold section including a first mold part providing a respective part of said operative surface of the first mold section, said first mold section further including a first clamping part, adjoining one end of said first mold part and providing a further part of said operative surface of said first mold section, said first clamping part being moveable towards and away from the opposing part of said second mold section independently of said first mold part, one of said first mold part and said second mold section being moveable towards and away from the other, and said first mold part and said second mold section defining between them a mold cavity having a first end remote from the first clamping part and a second end adjacent the first clamping part,
(b) introducing a molten plastics material and a foaming agent into the mold with the first mold part relatively widely separated from the second mold section,
(c) permitting the mixture to foam and compressing the foaming mixture within the mold by moving one of said first mold part and said second mold section towards the other, to form a part of the structure, and allowing the part of the structure so formed to solidify at least partially, separating the first mold part and the second mold section, and separating the first clamping part from the second mold section,
(d) removing the solidified structure partially from the mold, locating a free end portion of the part of the structure just molded between the first mold part and the second mold section, and an adjoining portion of the part of the structure just molded between the first clamping part and the second mold section,
(e) moving the first clamping part towards the second mold section to grip said adjoining portion between the first clamping part and the second mold section, and
(f) repeating step (b) to (e) in a repeating cycle wherein, each said cycle, the part of the structure molded between the first mold part and the second mold section is united with the portion of the previously molded part of the structure left in the mold, and wherein, in each said cycle, the first end of the mold cavity remains open to allow escape of surplus foam plastics material, while the second end of the mold cavity is closed by, in combination, the previously molded part of the structure and said first clamping part.

19. Apparatus for the continuous molding of a roller door structure comprising juxtaposed slats separated by hinge formations which allow the folding or rolling of the structure, said apparatus comprising:

(a) a mold which includes a first mold section and a second mold section which define opposed mold cavity surfaces complementary to the opposite surfaces of the structure to be molded, said first mold section including a first mold part providing a respective part of said operative surface of the first mold section, said first mold section further including a first clamping part, adjoining one end of said first mold part and providing a further part of said operative surface of said first mold section, means mounting said first clamping part for movement towards and away from the opposing part of said second mold section independently of said first mold part and means mounting one of said first mold part and said second mold section for movement towards and away from the other, the mold cavity defined between said first part and said second mold section at the end of the mold cavity remote from said first clamping part being open both when the first mold part is relatively widely separated from the second mold section and, to a lesser extent, when the first mold part is at its closest to the second mold section, and (b) means for introducing a molten plastics material and a foaming agent into the mold whereby a molten plastics/foaming agent mixture introduced into the mold with the first mold part relatively widely separated from the second mold section, can be permitted to foam in the mold and can be compressed within the mold by moving one of said first mold part and said second old section towards the other, to form a part of the structure, the structure so formed being allowed to solidify at least partially, the first mold part and the second mold section then being separated and the first clamping part and the second mold section subsequently being separated to allow removal of the solidified structure partially from the mold, whereafter a free end portion of the part of the structure just molded can be located between the first mold part and the second mold section, and an adjoining portion of the part of the structure just molded can be located between the first clamping part and the second mold section, and the first clamping part can be moved towards the second mold section to grip the adjoining portion between the first clamping part and the second mold section so that the mold cavity is closed at one end by the first clamping part and the previously demolded portion of the structure, before a fresh charge of foamable plastics is introduced into the mold cavity.

* * * * *